United States Patent
Chang et al.

(10) Patent No.: US 8,630,279 B2
(45) Date of Patent: Jan. 14, 2014

(54) METHOD FOR GENERATING DOWNLINK SIGNAL, AND METHOD FOR SEARCHING CELL

(75) Inventors: Kap-Seok Chang, Daejeon (KR); Il-Gyu Kim, Daejeon (KR); Nam-Il Kim, Daejeon (KR); Hyeong-Geun Park, Daejeon (KR); Young-Hoon Kim, Daejeon (KR); Seung-Chan Bang, Daejeon (KR)

(73) Assignees: Electronics and Telecommunications Research Institute, Daejeon (KR); SK Telecom., Co., Ltd, Seoul (KR); KT Corporation, Seongnam (KR)

( * ) Notice: Subject to any disclaimer, the term of this patent is extended or adjusted under 35 U.S.C. 154(b) by 355 days.

(21) Appl. No.: 12/160,719

(22) PCT Filed: May 30, 2007

(86) PCT No.: PCT/KR2007/002615
§ 371 (c)(1),
(2), (4) Date: Jul. 11, 2008

(87) PCT Pub. No.: WO2008/082038
PCT Pub. Date: Jul. 10, 2008

(65) Prior Publication Data
US 2011/0044256 A1    Feb. 24, 2011

(30) Foreign Application Priority Data
Dec. 28, 2006  (KR) .................. 10-2006-0136322

(51) Int. Cl.
*H04B 7/216* (2006.01)
*H04B 1/00* (2006.01)

(52) U.S. Cl.
USPC ......................................... 370/342; 375/134

(58) Field of Classification Search
USPC ............ 370/320, 342, 350; 375/260; 455/436
See application file for complete search history.

(56) References Cited

U.S. PATENT DOCUMENTS

| 5,930,366 A * | 7/1999 | Jamal et al. .................. 370/509 |
| 6,504,830 B1 | 1/2003 | Ostberg et al. |

(Continued)

FOREIGN PATENT DOCUMENTS

| CN | 1638370 | 7/2005 |
| JP | 2000-201134 | 7/2000 |

(Continued)

OTHER PUBLICATIONS

Il Gyu Kim et al., A Fast Cell Search Algorithm for Inter-Cell Asynchronous W-CDMA System using Code Hopping Method, 1998, pp. 1373-1377.

(Continued)

*Primary Examiner* — Dang Ton
*Assistant Examiner* — Ryan Kavleski
(74) *Attorney, Agent, or Firm* — Kile Park Reed & Houtteman PLLC

(57) ABSTRACT

An apparatus for generating a downlink signal and a cell search apparatus are disclosed. An apparatus for generating a downlink signal generates a downlink signal by one unique cell identification code group and a plurality of frame synchronization identification sequences, generates a downlink signal by a plurality of unique cell identification code groups and a plurality of frame synchronization identification sequences, or generates a downlink signal by a plurality of unique cell identification code groups and one frame synchronization identification sequence. A cell search apparatus obtains frame synchronization and identifies cells through a frame synchronization identification sequence and a unique cell identification code group.

25 Claims, 18 Drawing Sheets

(56) References Cited

U.S. PATENT DOCUMENTS

| | | | |
|---|---|---|---|
| 7,386,055 B2 * | 6/2008 | Morita et al. | 375/260 |
| 7,430,193 B2 | 9/2008 | Kim et al. | |
| 7,751,308 B2 | 7/2010 | Feng et al. | |
| 2002/0118705 A1 | 8/2002 | Sezgin et al. | |
| 2003/0072255 A1 | 4/2003 | Ma et al. | |
| 2003/0156574 A1 | 8/2003 | Raaf | |
| 2005/0157637 A1 | 7/2005 | Feng et al. | |
| 2006/0114812 A1 | 6/2006 | Kim et al. | |
| 2006/0126491 A1 | 6/2006 | Ro et al. | |
| 2007/0133386 A1 | 6/2007 | Kim et al. | |
| 2008/0019350 A1 * | 1/2008 | Onggosanusi et al. | 370/350 |
| 2008/0043858 A1 | 2/2008 | Lim et al. | |
| 2008/0095195 A1 * | 4/2008 | Ahmadi et al. | 370/478 |
| 2008/0132263 A1 * | 6/2008 | Yu et al. | 455/515 |
| 2008/0291945 A1 * | 11/2008 | Luo | 370/509 |
| 2009/0067370 A1 * | 3/2009 | Kim et al. | 370/328 |
| 2010/0226334 A1 * | 9/2010 | Ma et al. | 370/329 |
| 2011/0149947 A1 * | 6/2011 | Kim et al. | 370/350 |
| 2013/0021973 A1 * | 1/2013 | Aziz et al. | 370/328 |

FOREIGN PATENT DOCUMENTS

| | | |
|---|---|---|
| KR | 10-0479864 | 3/2005 |
| KR | 10-2005-0039263 | 4/2005 |
| KR | 10-2005-0063590 | 6/2005 |
| KR | 10-2005-0066562 | 6/2005 |
| KR | 10-2007-0039760 | 4/2007 |

OTHER PUBLICATIONS

Jongnam Kim et al., New Preamble Structures for Synchronization and Cell Searching in OFDM Systems, 2005, pp. 1623-1627.

International Search Report for PCT/KR2007/002615 dated Sep. 19, 2007.

Written Opinion of the International Searching Authority for PCT/KR2007/002615 dated Sep. 19, 2007.

* cited by examiner

METHOD FOR GENERATING DOWNLINK SIGNAL, AND METHOD FOR SEARCHING CELL

TECHNICAL FIELD

The present invention relates to a method for generating a downlink signal and a method for performing a cell search. More particularly, the present invention relates to a method for searching a cell in a cellular system that is based on an orthogonal frequency division multiplexing (OFDM) scheme.

BACKGROUND ART

For an initial synchronization in a cellular system, a terminal should be able to realize time synchronization and frequency synchronization based on signals of a base station. In addition, the terminal should be able to perform a cell search. After realizing the initial synchronization, the terminal should be able to trace time and frequency, and also, for a handover, it should be able to realize time and frequency synchronizations and perform a cell search with respect to an adjacent cell.

Exemplary techniques for a cell search are found at a thesis published in IEEE VTC Fall, OFDM Section IV-6 (September 2005), in which two schemes of frame structures are proposed. In a first scheme, one frame is divided into four time blocks, where synchronization identification information, cell group identification information, unique cell identification information, and synchronization identification information are allocated in the four time blocks, respectively. In a second scheme, one frame is divided into four time blocks, where synchronization identification information and unique cell identification information are allocated in first and third time blocks, and synchronization identification information and cell group identification information are allocated in second and fourth time blocks.

According to the first scheme, the symbol synchronization is obtained only in the first time block. Therefore, a rapid synchronization acquisition within a predefined 4.5 ms may become impossible during turning on of the terminal or a handover between heterogeneous networks. In addition, it is difficult to acquire a diversity gain by accumulating synchronization identification information for a rapid synchronization acquisition.

On the other hand, according to the second scheme, for frame synchronization, the unique cell identification information or the cell group identification information should be correlated simultaneously with the synchronization acquisition. Therefore, the cell search process is complex and a rapid cell search is difficult.

As another technique for the cell search, it has been proposed to use a separate preamble in order to acquire synchronization and search a cell. However, such a technique cannot be applied to a system that does not involve a preamble. In addition, since a preamble is located forward in a frame, the terminal should wait for a subsequent frame in order to acquire synchronization at a time that is not a start of the frame. In particular, although the terminal should acquire the initial symbol synchronization within 4.5 msec when performing hand-off among a GSM mode, a WCDMA mode, and a 3GPP LTE mode hand-off, there may be an occasion in which the initial symbol synchronization cannot be acquired within the 4.5 msec since the synchronization is only acquired by a frame unit.

DISCLOSURE

Technical Problem

The technical object of the present invention is to provide a method for searching a cell through a rapid synchronization acquisition and a method for generating a downlink signal enabling the rapid synchronization acquisition.

Technical Solution

A method for generating a downlink signal for a predetermined cell according to an exemplary embodiment of the present invention includes: generating a downlink frame including a plurality of synchronization durations; arranging a unique cell identification code group corresponding to the predetermined cell in the plurality of synchronization durations such that a plurality of repetition patterns are formed in a time domain; converting the downlink frame into a time domain signal; and generating a downlink signal by applying, in the time domain signal, a plurality of frame synchronization identification sequences to the plurality of synchronization durations, respectively.

At this time, the frame synchronization identification sequence may include a plurality of orthogonal identification codes respectively corresponding to the plurality of repetition patterns, and the generating of the downlink signal may include generating the downlink signal by respectively multiplying the plurality of orthogonal identification codes to the plurality of repetition patterns.

On the other hand, the generating of the downlink signal may include generating the downlink signal by replacing a part of the plurality of repetition patterns with the frame synchronization identification sequence.

A method for generating a downlink signal for a predetermined cell according to another exemplary embodiment of the present invention includes: generating a downlink frame including a plurality of synchronization durations; arranging a plurality of unique cell identification code groups in the plurality of synchronization durations respectively such that a plurality of repetition patterns may be formed in a time domain; converting the downlink frame into a time domain signal; and generating a downlink signal by applying, in the time domain signal, one frame synchronization identification sequence to each of the plurality of synchronization durations.

A method for generating a downlink signal for a predetermined cell according to still another exemplary embodiment of the present invention includes generating a downlink frame including a plurality of synchronization durations that form a plurality of synchronization duration groups, arranging a plurality of unique cell identification code groups in the plurality of synchronization durations such that a plurality of repetition patterns are formed in a time domain, converting the downlink frame into a time domain signal, and generating a downlink signal by applying, in the time domain signal, a plurality of frame synchronization identification sequences to the plurality of synchronization durations, respectively. The plurality of unique cell identification code groups respectively correspond to the plurality of synchronization duration groups, the plurality of frame synchronization identification sequences respectively correspond to a plurality of synchronization durations included in the synchronization duration group, the arranging of the plurality of unique cell identification code groups includes arranging the plurality of unique cell identification code groups in a synchronization duration of a synchronization duration group corresponding thereto, and the generating of the downlink signal includes applying the plurality of frame synchronization identification sequences to a corresponding synchronization duration.

A method for searching a cell according to an exemplary embodiment of the present invention includes: receiving a downlink signal having a frame including a plurality of synchronization durations; obtaining frame synchronization by applying a plurality of frame synchronization identification sequences respectively applied to the plurality of synchronization duration to the downlink signal; extracting a synchronization duration symbol of a time domain from the downlink signal based on the frame synchronization; converting the synchronization duration symbol of the time domain into a synchronization duration symbol in a previous form that is prior to application of the frame synchronization identification sequence; converting the synchronization duration symbol in the previous form into a symbol of a frequency domain; extracting a unique cell identification code group from the symbol of the frequency domain; and identifying a cell by the unique cell identification code group.

At this time, the frame synchronization identification sequence may include a plurality of orthogonal identification codes that respectively correspond to a plurality of repetition pattern.

In addition, at this time, the obtaining of the frame synchronization may include: generating a multiplied signal by multiplying the frame synchronization identification sequence to the downlink signal; generating a delay signal that is obtained by delaying the multiplied signal by a delay time corresponding to the repetition pattern; generating a correlation result by correlating the multiplied signal and the delay signal; and obtaining symbol synchronization and frame synchronization through a magnitude of the correlation result.

A method for searching a cell according to another exemplary embodiment of the present invention includes: receiving a downlink signal having a frame including a plurality of synchronization durations forming a plurality of synchronization duration groups; obtaining primary frame synchronization by applying a plurality of frame synchronization identification sequences respectively corresponding to the plurality of synchronization duration groups to the downlink signal; extracting a plurality of synchronization duration symbols corresponding to the primary frame synchronization based on the primary frame synchronization; converting the plurality of synchronization duration symbols into a plurality of synchronization duration symbols in a previous form that is prior to an application of the plurality of frame synchronization identification sequence; converting the plurality of synchronization duration symbols in the previous form to a plurality of frequency domain symbols; extracting a plurality of unique cell identification code groups from each of the plurality of frequency domain symbols; obtaining frame synchronization by the plurality of unique cell identification code groups and the primary frame synchronization; and identifying a cell by the plurality of unique cell identification code groups.

A method for searching a cell according to still another exemplary embodiment of the present invention includes: receiving a downlink signal having a frame including a plurality of synchronization durations; determining locations of the plurality of synchronization durations by applying one frame synchronization identification sequence to the downlink signal; extracting a plurality of synchronization duration symbols respectively corresponding to the plurality of synchronization durations from the downlink signal based on the location of the plurality of synchronization durations; converting the plurality of synchronization duration symbols into a plurality of synchronization duration symbols that are prior to an application of the frame synchronization identification sequence; converting the plurality of synchronization duration symbols in the previous form into a plurality of frequency domain symbols; extracting a plurality of unique cell identification code groups from each of the plurality of frequency domain symbols; obtaining frame synchronization by the locations of the plurality of synchronization durations and the plurality of unique cell identification code groups; and identifying a cell by the plurality of unique cell identification code groups.

BEST MODE

Figure 1:
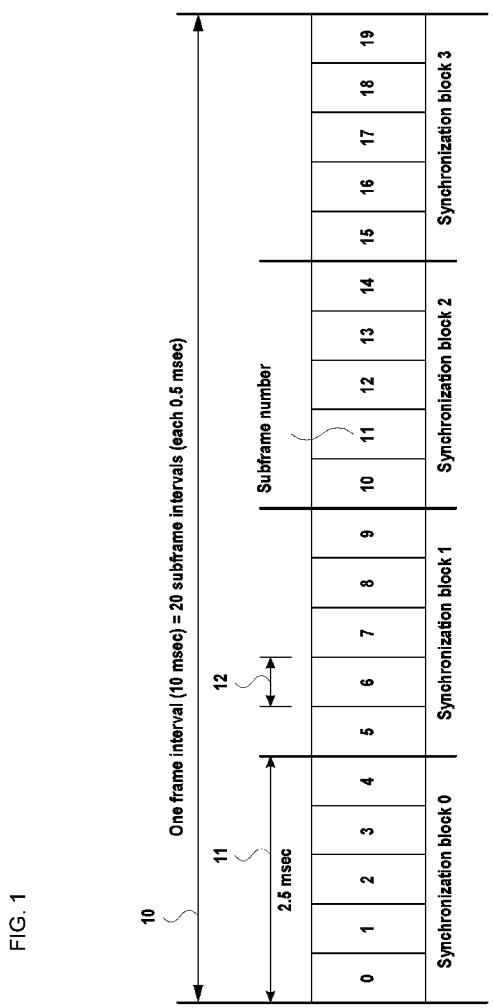
FIG. 1 is a frame configuration diagram showing an OFDM-based downlink frame according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Hereinafter, a structure of an OFDM-based downlink frame according to an exemplary embodiment of the present invention is described with reference to FIG. 1 to FIG. 5.

FIG. 1 is a frame configuration diagram showing an OFDM-based downlink frame according to an exemplary embodiment of the present invention. In FIG. 1, the horizontal axis is a time axis, and the vertical axis is a frequency axis or a subcarrier axis.

As shown in FIG. 1, a downlink frame 10 according to an exemplary embodiment of the present invention has a time interval of 10 msec and includes four synchronization blocks 11. Each synchronization block 11 has a time interval of 2.5 msec and includes five subframes 12. Each subframe 12 has a time interval of 0.5 msec, and thus a downlink frame 10 includes twenty subframes 12 in total.

Figure 2:
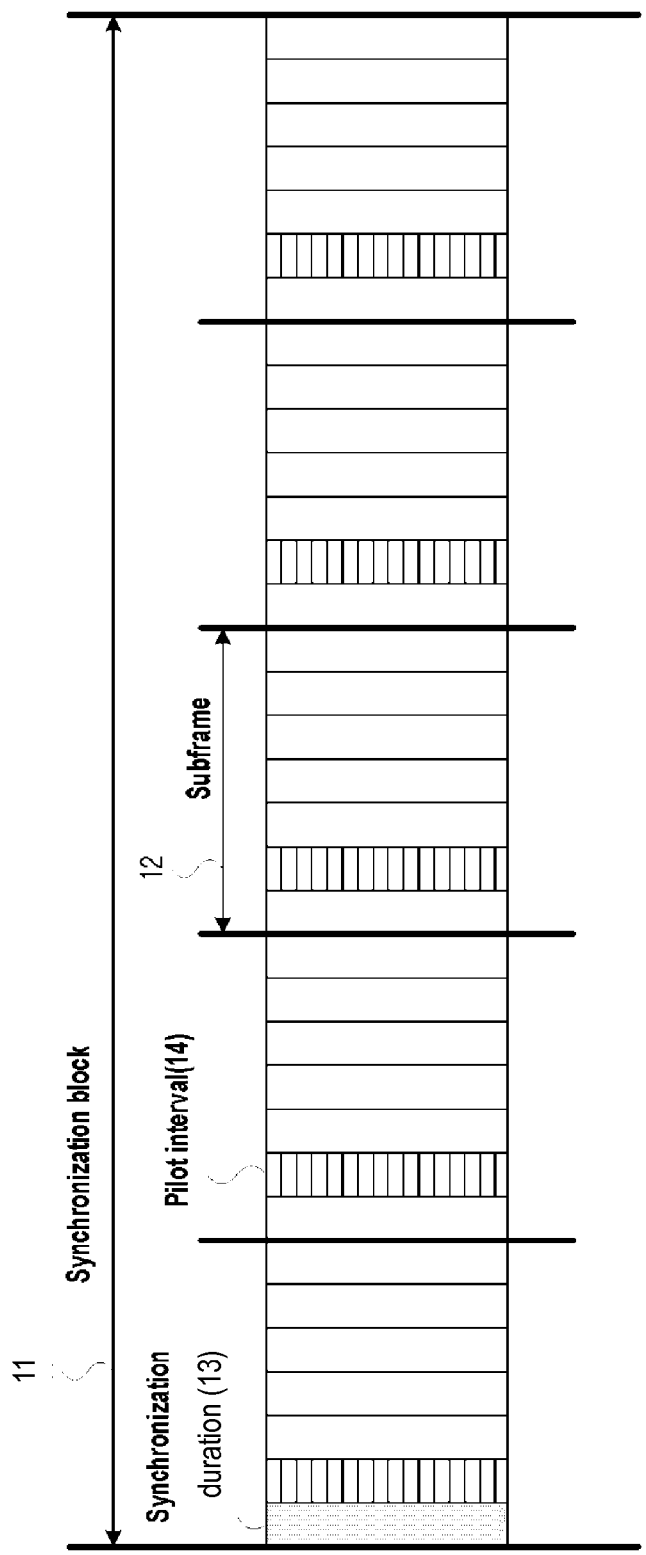
FIG. 2 is a frame configuration diagram showing an OFDM-based synchronization block according to an exemplary embodiment of the present invention.

FIG. 2 is a frame configuration diagram showing an OFDM-based synchronization block according to an exemplary embodiment of the present invention.

As shown in FIG. 2, each synchronization block 11 includes five subframes 12, and each subframe 12 includes seven OFDM symbols. Although a synchronization block 11 according to an exemplary embodiment of the present invention includes a synchronization duration 13 corresponding one OFDM symbol interval as a starting interval of the synchronization block as shown in FIG. 2, it is not necessarily limited thereto. That is, a synchronization block 11 may include the synchronization duration 13 in an arbitrary duration in the synchronization block 11, and it may include more than one synchronization duration 13. According to an exemplary embodiment of FIG. 2, a repetition period of the synchronization duration 13 is the same as a sum of total time of five subframes 12.

As shown in FIG. 2, a subframe 12 according to an exemplary embodiment of the present invention includes a pilot interval 14 including pilot symbols, and a pilot interval 14 corresponds to 1 OFDM symbol interval. However, it is not necessarily limited thereto. That is, a subframe 12 may include more than one pilot interval 14. In addition, although the pilot symbols may be located in one OFDM symbol interval according to a time division multiplexing (TDM) structure as shown in FIG. 2, they may be located in more than one OFDM symbol interval according to a frequency domain-time domain dispersion (also called a scattered division multiplexing (SDM)) structure.

Figure 3:
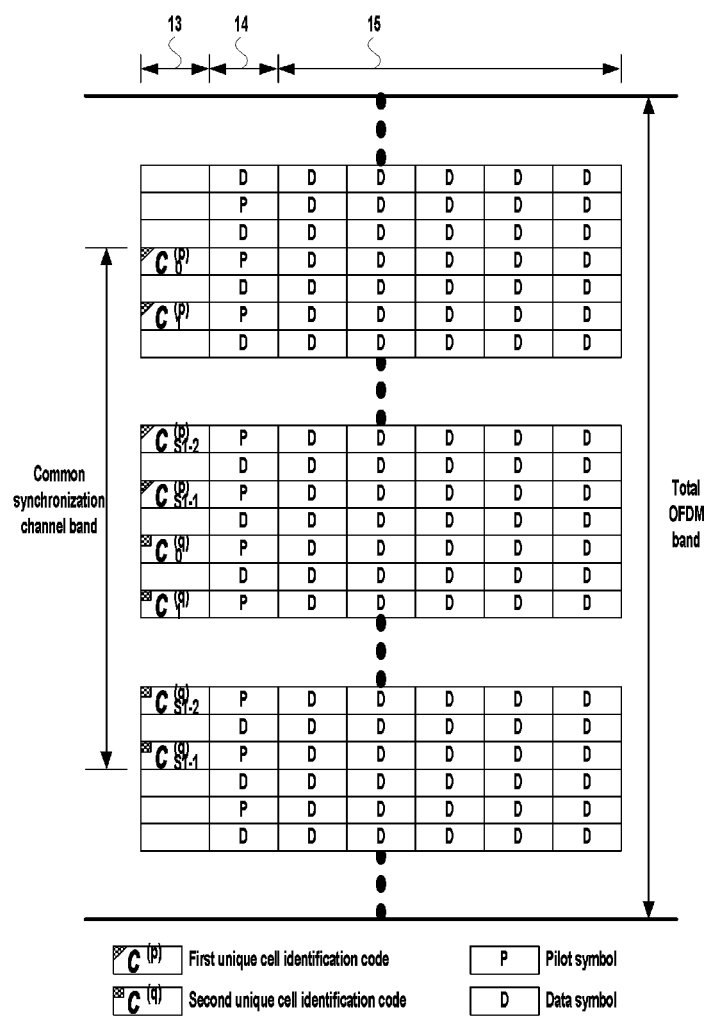
FIG. 3 is a frame configuration diagram showing an OFDM-based downlink subframe according to an exemplary embodiment of the present invention.
Figure 4:
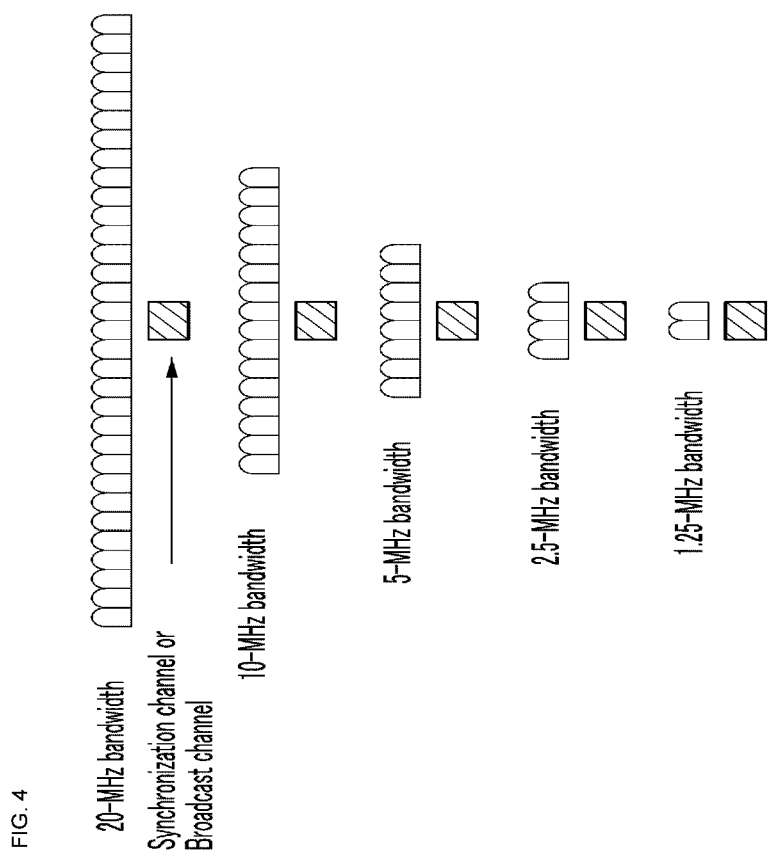
FIG. 4 is a drawing showing bandwidth scalability of a downlink frame according to an exemplary embodiment of the present invention.
Figure 5:
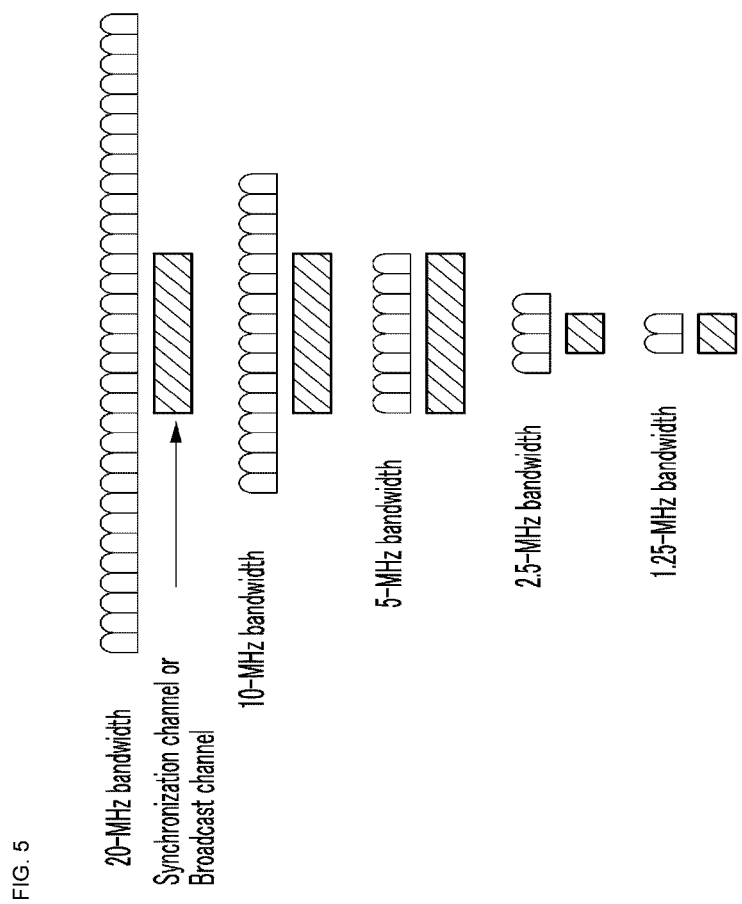
FIG. 5 is a drawing showing bandwidth scalability of a downlink frame according to another exemplary embodiment of the present invention.

FIG. 3 is a frame configuration diagram showing an OFDM-based downlink subframe 12 according to an exemplary embodiment of the present invention.

As shown in FIG. 3, a subframe 12 according to an exemplary embodiment of the present invention includes a synchronization duration 13, a pilot interval 14, and a data interval 15.

A plurality of unique cell identification codes (hereinafter, also called unique cell identification code groups) are located in a frequency domain corresponding to a common synchronization channel of the synchronization duration 13. At this time, elements of the plurality of unique cell identification codes are arranged with predetermined spacing. According to FIG. 3, two unique cell identification codes are arranged in a common synchronization channel, and elements of the two unique cell identification codes are arranged with spacing of one subcarrier. The unique cell identification code may be expressed as in the following Equation 1.

$$C^{(k)} = \{c_0^{(k)}, c_1^{(k)}, \ldots, c_{N_G-1}^{(k)}\} \quad \text{(Equation 1)}$$

In Equation 1, k denotes a unique cell identification code number, and $N_G$ denotes a length of the unique cell identification code. According to an exemplary embodiment of the present invention, $N_G$ may denote half of a total number of available subcarriers allocated to the common synchronization channel.

Meanwhile, a Hadamard sequence, a Gold sequence, a Golay sequence, a KAZAC sequence, a generalized chirp-like (GCL) sequence, a pseudo-noise (PN) sequence, etc. may be used in order to obtain the unique cell identification code. An element ($c_n^{(k)}$) of a unique cell identification code according to the GCL sequence may be expressed as in Equation 2.

$$c_n^{(k)} = \exp\left\{-j2\pi k \frac{n(n+1)}{2N_G}\right\}, n = 0, 1, \ldots, N_G - 1 \quad \text{(Equation 2)}$$

Meanwhile, a plurality of unique cell identification codes according to an exemplary embodiment of the present invention may be arranged in a frequency domain of the common synchronization channel, as shown in FIG. 3. This is in order to enable mobile stations using various bandwidths, such as a mobile station using a 1.25 MHz bandwidth and a mobile station using a 2.5 MHz bandwidth, to receive their unique cell identification codes, in a mobile communication system supporting a scalable bandwidth shown in FIG. 4 and FIG. 5. According to an exemplary embodiment of the present invention, the common synchronization channel may use a central bandwidth of 1.25 MHz or 5 MHz excluding a DC subcarrier. When a frequency domain of the common to synchronization channel is 1.25 MHz, the number of subcarriers in a corresponding frequency domain is 76, and therefore $N_G$ equals 38.

The pilot interval 14 includes a pilot symbol, and it may also include a data symbol in addition to the pilot symbol.

The data interval 15 includes a data symbol.

Hereinafter, an apparatus for generating a downlink signal according to an exemplary embodiment of the present invention 100 is described with reference to FIG. 6 to FIG. 10.

Figure 6:
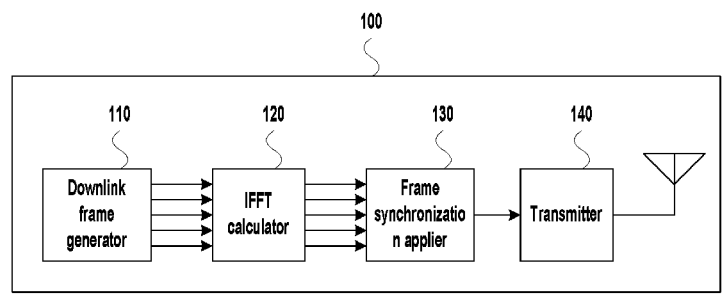
FIG. 6 is a block diagram showing an apparatus for generating a downlink signal according to an exemplary embodiment of the present invention.

FIG. 6 is a block diagram showing an apparatus 100 for generating a downlink signal according to an exemplary embodiment of the present invention.

As shown in FIG. 6, an apparatus for generating a downlink signal 100 includes a downlink frame generator 110, an inverse fast Fourier transform (IFFT) calculator 120, a frame synchronization applier 130, and a transmitter 140.

Figure 7:
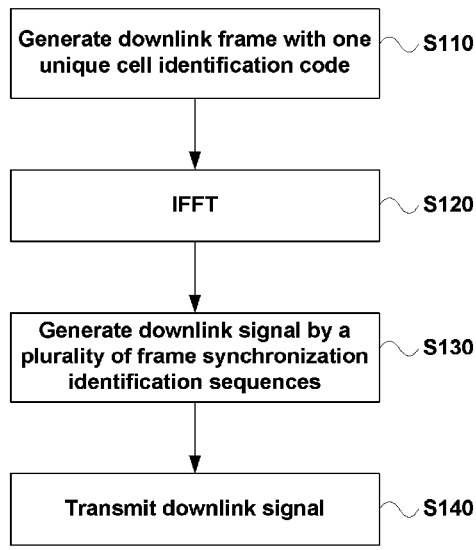
FIG. 7 is a flowchart showing a method for generating a downlink signal according to the first exemplary embodiment of the present invention.

FIG. 7 is a flowchart showing a method for generating a downlink signal according to the first exemplary embodiment of the present invention.

Firstly, the downlink frame generator 110 generates a downlink frame as shown in FIG. 1 to FIG. 3 (S110). That is, the downlink frame generator 110 generates a frame including a plurality of synchronization durations, and arranges a unique cell identification code group in the plurality of synchronization durations in the downlink frame. At this time, the downlink frame generator 110 may arrange the unique cell identification code group in the downlink frame such that a plurality of repetition patterns are formed in a time domain. For example, when the downlink frame generator 110 arranges elements of the unique cell identification code group in the downlink frame by an interval of one subcarrier, two repetition patterns are formed.

Subsequently, the IFFT calculator 120 generates a time-axis signal by performing an IFFT transform with the downlink frame generated by the downlink frame generator 110 (S120).

The frame synchronization applier 130 generates the downlink signal by applying a plurality of frame synchronization identification sequences to the synchronization durations 13 of the signal on the time-axis generated by the IFFT calculator 120 (S130). At this time, the frame synchronization applier 130 applies different frame synchronization identification sequences to the plurality of synchronization durations 13 that are included in the downlink frame. That is, the plurality of frame synchronization identification sequences applied by the frame synchronization applier 130 according to a first exemplary embodiment of the present invention respectively correspond to the plurality of synchronization durations 13 that are included in the downlink frame.

The transmitter 140 transforms the downlink signal generated by the frame synchronization applier 130 to an analog signal, and then transmits the same to a cell region through an antenna after modulation/demodulation thereof (S140).

According to a method for generating a downlink signal of the first exemplary embodiment of the present invention, the downlink frame is generated such that the unique cell identification code group and the frame synchronization identification sequence is arranged as in the following Equation 3.

$$[((m,k),0), ((m,k),1), ((m,k),2), (((m,k),3)] \quad \text{(Equation 3)}$$

In Equation 3, (m,k) denotes the unique cell identification code group arranged in four synchronization durations according to the first exemplary embodiment of the present invention, and 0 to 3 denote index numbers of the frame synchronization identification sequences that are respectively applied to the four synchronization durations.

According to the first exemplary embodiment of the present invention, the mobile station can obtain the frame synchronization by the frame synchronization identification sequences, and may identify a cell by the unique cell identification code group.

Figure 8:
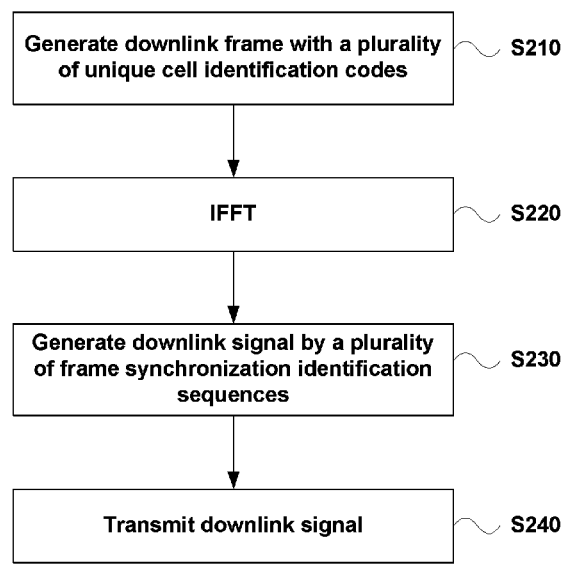
FIG. 8 is a flowchart showing a method for generating a downlink signal according to another exemplary embodiment of the present invention.

FIG. 8 is a flowchart showing a method for generating a downlink signal according to another exemplary embodiment of the present invention.

Firstly, the downlink frame generator 110 generates a downlink frame as shown in FIG. 1 to FIG. 3 (S210). That is, downlink frame generator 110 generates a frame including a plurality of synchronization durations, and arranges a plurality of unique cell identification code groups in the plurality of synchronization durations in the downlink frame. At this time, the plurality of synchronization durations form one synchronization duration group, and the downlink frame includes a plurality of synchronization duration groups. In addition, the plurality of unique cell identification code groups respectively correspond to the plurality of synchronization duration groups. The downlink frame generator 110 arranges the plurality of unique cell identification code groups in synchronization durations of a corresponding synchronization duration group.

Subsequently, the IFFT calculator 120 generates a time domain signal by performing an IFFT transform with the downlink frame generated by the downlink frame generator 110 (S220).

The frame synchronization applier 130 generates the downlink signal by applying a plurality of frame synchronization identification sequences to the synchronization durations 13 of the signal on the time-axis generated by the IFFT calculator 120 (S230). At this time, the plurality of frame synchronization identification sequences respectively correspond to the plurality of synchronization durations included in the synchronization duration group. Therefore, the frame synchronization applier 130 applies the frame synchronization identification sequence to the corresponding synchronization duration.

The transmitter 140 transforms the downlink signal generated by the frame synchronization applier 130 to an analog signal, and then transmits the same to a cell region through an antenna after modulation/demodulation thereof (S240).

According to a method for generating a downlink signal of the second exemplary embodiment of the present invention, the downlink frame is generated such that the unique cell identification code group and the frame synchronization identification sequence is arranged as in the following Equation 4.

$$[((m,k),0) ((m,k),1), ((m,l),0), ((m,l),1)] \quad \text{(Equation 4)}$$

Equation 4 shows a structure of a downlink frame including two synchronization duration groups. At this time, each synchronization duration group includes two synchronization durations. In Equation 4, (m,k) denotes a unique cell identification code group arranged in two synchronization durations that are forward among the four synchronization durations according to the second exemplary embodiment of the present invention, and (m,l) denotes a unique cell identification code group arranged in two synchronization durations that are rearward among the four synchronization durations according to the second exemplary embodiment of the present invention. In addition, 0 and 1 are index numbers of the frame synchronization identification sequences that are applied to the four synchronization durations.

According to the second exemplary embodiment of the present invention, the mobile station can obtain only a part of frame synchronization by the frame synchronization identification sequence, and can obtain full frame synchronization only after considering the unique cell identification code group. In addition, the mobile station can identify a cell by the unique cell identification code groups. That is, the two unique cell identification codes groups of (m,k) and (m,l) indicate one cell.

According to the second exemplary embodiment of the present invention, although a half of the cells can be identified in comparison with the case according to the first exemplary embodiment of the present invention, complexity is reduced since the mobile station can obtain the frame synchronization by two frame synchronization identification sequences.

Figure 9:
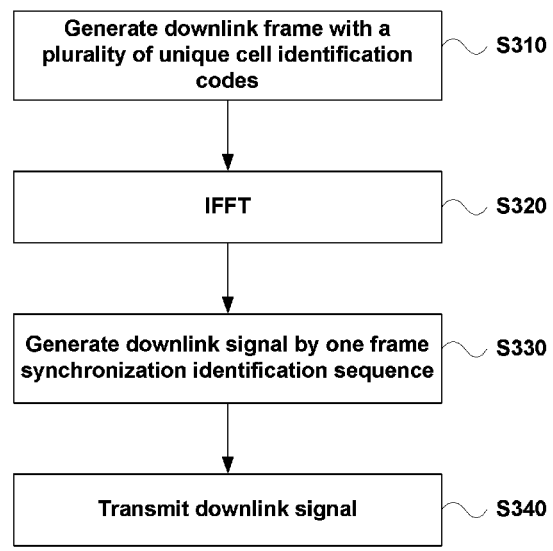
FIG. 9 is a flowchart showing a method for generating a downlink signal according to still another exemplary embodiment of the present invention.

FIG. 9 is a flowchart showing a method for generating a downlink signal according to still another exemplary embodiment of the present invention.

Firstly, the downlink frame generator 110 generates a downlink frame as shown in FIG. 1 to FIG. 3 (S310). That is, the downlink frame generator 110 generates a frame including a plurality of synchronization durations, and arranges a plurality of unique cell identification code groups in the plurality of synchronization durations in the downlink frame. That is, the plurality of unique cell identification code groups arranged by the downlink frame generator 110 respectively correspond to the plurality of synchronization durations.

Subsequently, the IFFT calculator 120 generates a signal on a time-axis by performing an IFFT transform with the downlink frame generated by the downlink frame generator 110 (S320).

The frame synchronization applier 130 generates the downlink signal by applying one frame synchronization identification sequence to the synchronization durations 13 of the signal on the time-axis generated by the IFFT calculator 120 (S330).

The transmitter 140 transforms the downlink signal generated by the frame synchronization applier 130 to an analog signal, and then transmits the same to a cell region through an antenna after modulation/demodulation thereof (S340).

According to a method for generating a downlink signal of the third exemplary embodiment of the present invention, the downlink frame is generated such that the unique cell identification code group and the frame synchronization identification sequence is arranged as in the following Equation 5.

$$[((m,k),0), ((m,l),0), ((l,m),0), ((k,m),0)] \quad \text{(Equation 5)}$$

In Equation 5, (m,k), (m,l), (l,m), and (k,m) denote unique cell identification code groups arranged in four synchronization durations according to the third exemplary embodiment of the present invention, and 0 denotes an index number of the frame synchronization identification sequence applied to the four synchronization durations.

According to the third exemplary embodiment of the present invention, the mobile station cannot obtain the frame synchronization by the frame synchronization identification sequence, and may obtain the frame synchronization only after considering the unique cell identification code groups. In addition, the mobile station can identify a cell by the unique cell identification code groups. That is, the four unique cell identification code groups of (m,k), (m,l), (l,m), and (k,m) indicate one cell.

According to the third exemplary embodiment of the present invention, although a quarter of the cells can be identified in comparison with the case according to the first exemplary embodiment of the present invention, complexity is reduced since the mobile station can obtain the frame synchronization by one frame synchronization identification sequence.

Hereinafter, the frame synchronization applier 130 according to an exemplary embodiment of the present invention is described with reference to FIG. 10 and FIG. 11.

Figure 10:
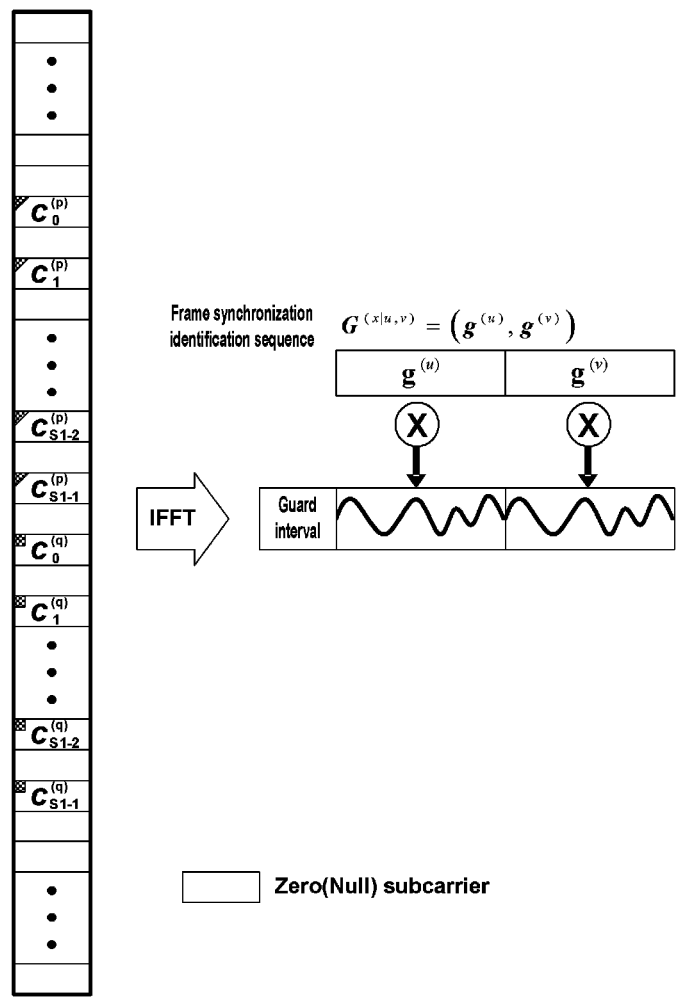
FIG. 10 is a schematic diagram showing an operation of a frame synchronization applier according to an exemplary embodiment of the present invention.

FIG. 10 is a schematic diagram showing an operation of a frame synchronization applier according to an exemplary embodiment of the present invention.

According to the exemplary embodiment of FIG. 10, one frame synchronization identification sequence includes two orthogonal identification codes. Therefore, the frame synchronization applier 130 according to an exemplary embodiment of FIG. 10 respectively multiplies the two orthogonal identification codes to two repetition patterns that are formed in synchronization durations of time domain signals generated by the IFFT calculator 120.

An x-th frame synchronization identification sequence may be expressed as in the following Equation 6.

$$G^{(x|u,v)} = (g^{(u)}, g^{(v)}) \quad \text{(Equation 6)}$$

As in Equation 3, the x-th frame synchronization identification sequence includes a u-th orthogonal identification code and a v-th orthogonal identification code. That is, the index number x of the frame synchronization identification sequence is determined as a combination of two index numbers (u,v) of the orthogonal identification code.

On the other hand, the u-th orthogonal identification code and the v-th orthogonal identification code may be expressed as in the following Equation 7.

$$g^{(u)} = \{g_0^{(u)}, g_1^{(u)}, \ldots, g_{N_F-1}^{(u)}\}$$

$$g^{(v)} = \{g_0^{(v)}, g_1^{(v)}, \ldots, g_{N_F-1}^{(v)}\} \quad \text{(Equation 7)}$$

In Equation 7, u and v are index numbers of the orthogonal identification code. In addition, $N_F$ is a length of the orthogonal identification code, and is determined as the number of samples corresponding to half of one OFDM symbol interval excluding a guard interval. In order to obtain an orthogonal identification code, one of a Hadamard sequence, a Gold sequence, a Golay sequence, a GCL sequence, a KAZAC sequence, and a PN sequence may be used.

Figure 11:
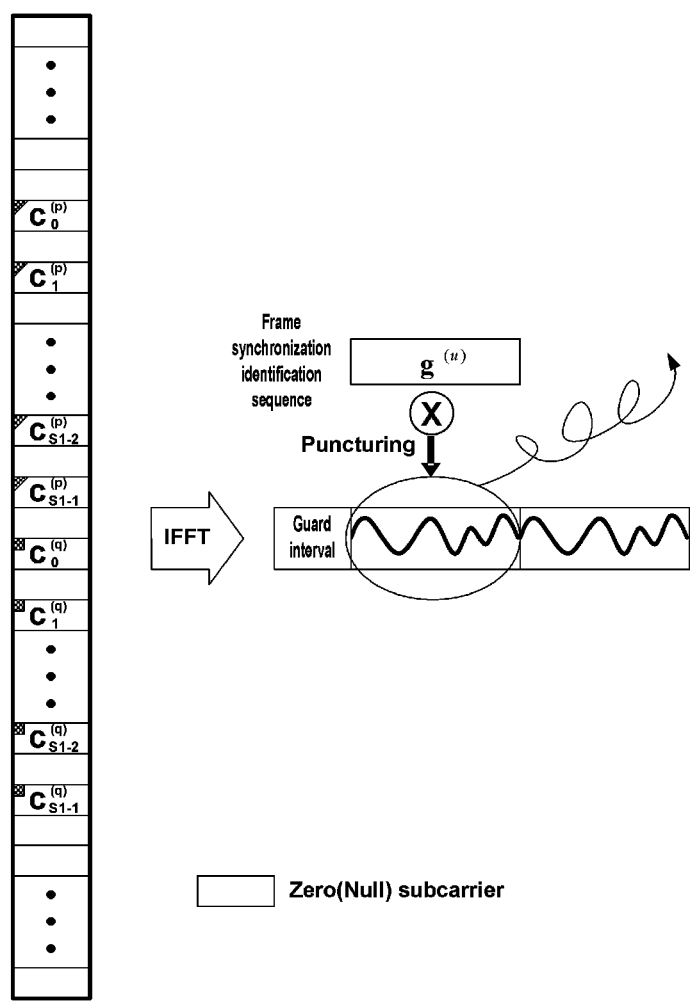
FIG. 11 is a schematic diagram showing an operation of a frame synchronization applier according to another exemplary embodiment of the present invention.

FIG. 11 is a schematic diagram showing an operation of a frame synchronization applier according to another exemplary embodiment of the present invention.

According to the exemplary embodiment of FIG. 11, one frame synchronization identification sequence consists of one orthogonal identification code. Therefore, by the frame synchronization applier 130 according to an exemplary embodiment of FIG. 11, one of the two repetition patterns formed in the synchronization duration of the time domain signal generated by the IFFT calculator 120 is substituted to the frame synchronization identification sequence.

Hereinafter, a mobile station 200 and its cell search method according to an exemplary embodiment of the present invention is described with reference to FIG. 12 to FIG. 18.

Figure 12:
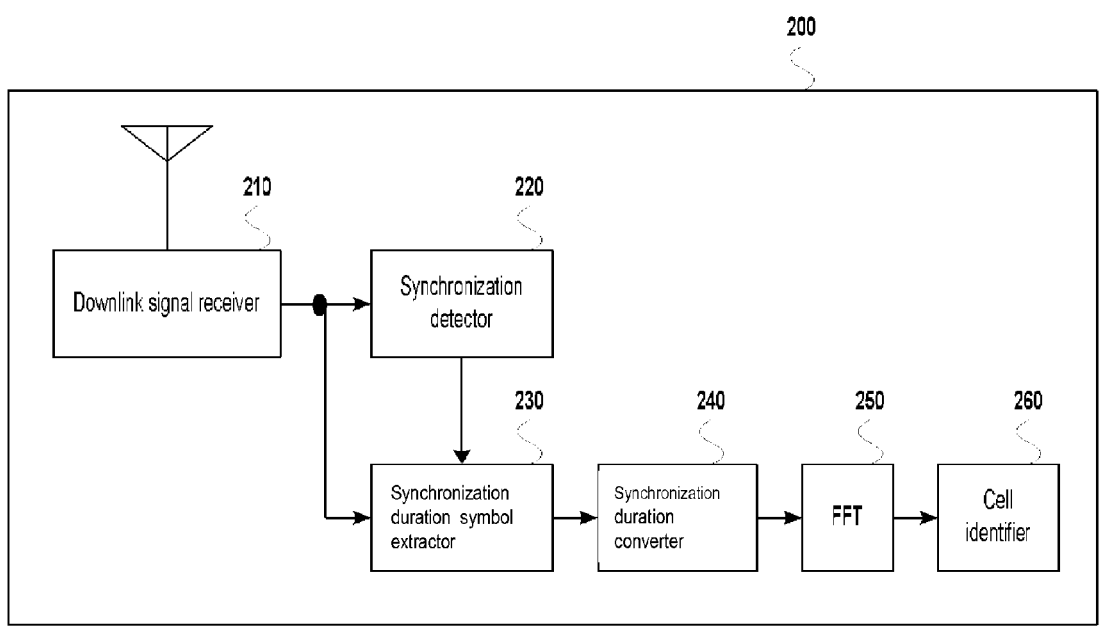
FIG. 12 is a block diagram showing a mobile station that performs a cell search according to an exemplary embodiment of the present invention.

FIG. 12 is a block diagram showing a mobile station 200 that performs a cell search according to an exemplary embodiment of the present invention.

As shown in FIG. 12, the mobile station 200 includes a downlink signal receiver 210, a synchronization detector 220, a synchronization duration symbol extractor 230, a synchronization duration converter 240, a fast Fourier transform (FFT) calculator 250, and a cell identifier 260.

Figure 13:
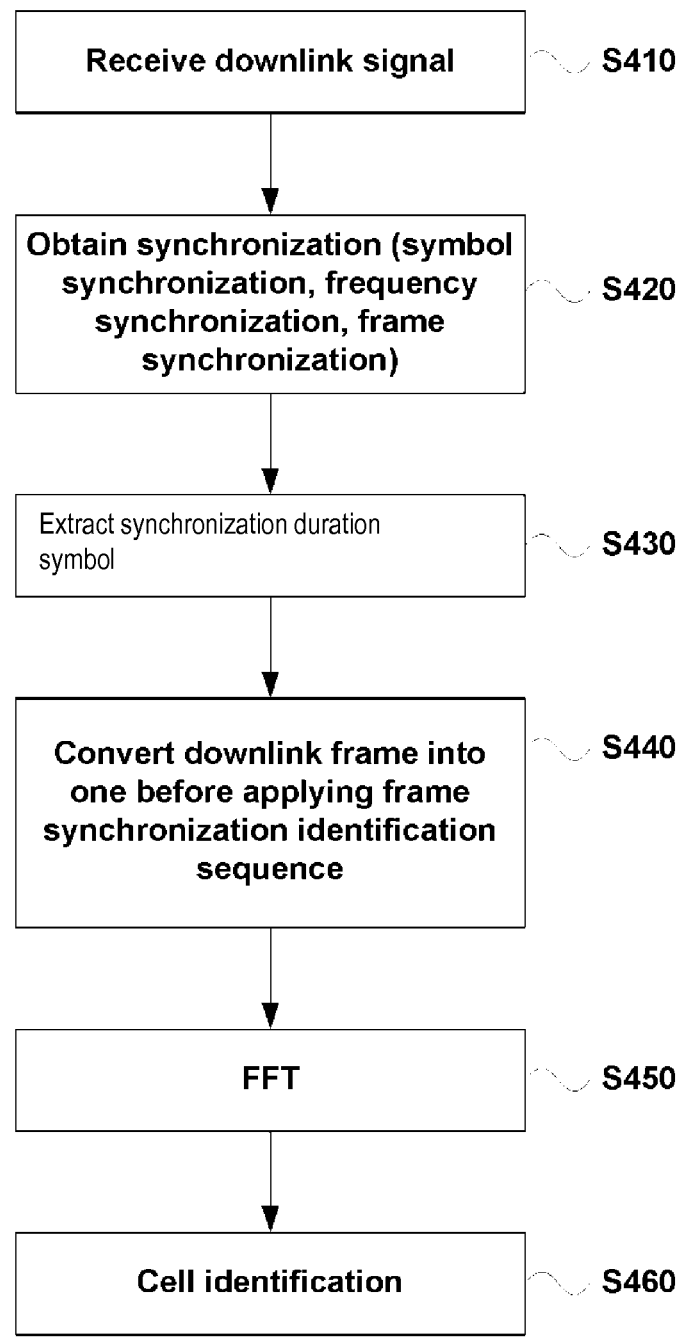
FIG. 13 is a flowchart showing a cell search method according to a first exemplary embodiment of the present invention.

FIG. 13 is a flowchart showing a cell search method according to a first exemplary embodiment of the present invention.

Firstly, the downlink signal receiver 210 receives a downlink signal from a channel (S410). The downlink signal receiver 210 according to an exemplary embodiment of FIG. 13 receives the downlink signal generated according to an exemplary embodiment of FIG. 7.

Subsequently, the plurality of frame synchronization identification sequences that are respectively applied to the plurality of synchronization durations included in the downlink frame are applied by the synchronization detector 220 to the downlink signal that is received by the downlink signal receiver 210. Thereby, the synchronization detector 220 obtains symbol synchronization, frequency synchronization, and frame synchronization (S420). When the downlink frame is in a structure according to Equation 3, the synchronization detector 220 uses four frame synchronization identification sequences. The synchronization detector 220 may have a different structure depending on methods by which the downlink signal is generated.

Figure 14:
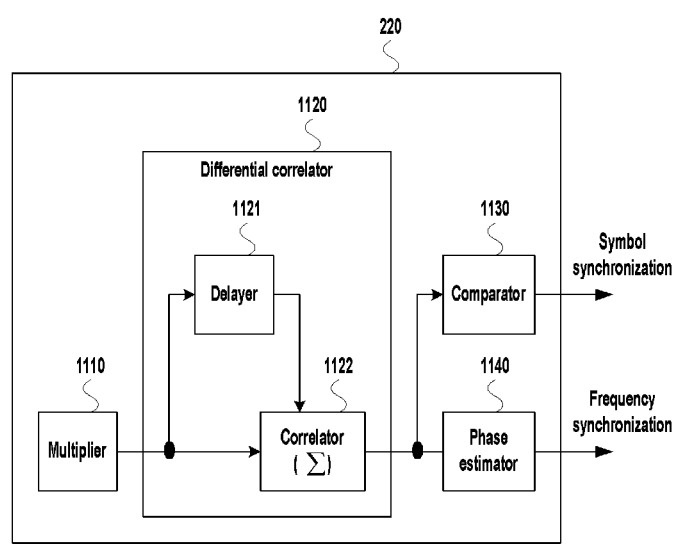
FIG. 14 is a block diagram showing a synchronization detector that detects synchronization from a downlink signal generated according to the exemplary embodiment of FIG. 10.

FIG. 14 is a block diagram showing a synchronization detector 220 that detects synchronization from a downlink signal generated according to the exemplary embodiment of FIG. 10.

As shown in FIG. 14, the synchronization detector 220 for detecting synchronization in the downlink signal generated according to the exemplary embodiment of FIG. 10 includes a multiplier 1110, a differential correlator 1120, a comparator 1130, and a phase estimator 1140. The differential correlator 1120 includes a delayer 1121 and a correlator 1122.

The multiplier 1110 multiplies the frame synchronization identification code of two orthogonal identification codes to the downlink signal received by the downlink signal receiver 210, and outputs the multiplication result.

The delayer 1121 delays the output signal of the multiplier 1110 by a time period corresponding to half of the OFDM symbol interval length, and outputs the delayed signal.

The correlator 1122 correlates the output signal of the multiplier 1110 and the output signal of the delayer 1121, and outputs the correlation result. According to the exemplary embodiment of FIG. 13, the correlator 1122 uses four frame synchronization identification sequences in total, and performs the correlation in parallel. Thereby, the mobile station 200 may obtain frame synchronization by the unit of synchronization blocks.

The comparator 1130 obtains the symbol synchronization and a location of the synchronization duration 13 by calculating a magnitude (that is, $I^2+Q^2$) of the correlation result outputted from the correlator 1122 and then finding a sample time point where the correlation result becomes above a predetermined level. In addition, the comparator 1130 according to an exemplary embodiment of FIG. 14 finds the index number of the frame synchronization identification sequence by which the magnitude of the correlation result becomes above the predetermined level, and then determines one of the obtained locations of the synchronization duration 13 as the frame synchronization.

In addition, the phase estimator 1140 obtains frequency synchronization by estimating a phase of the correlation result outputted by the correlator 1122.

Figure 15:
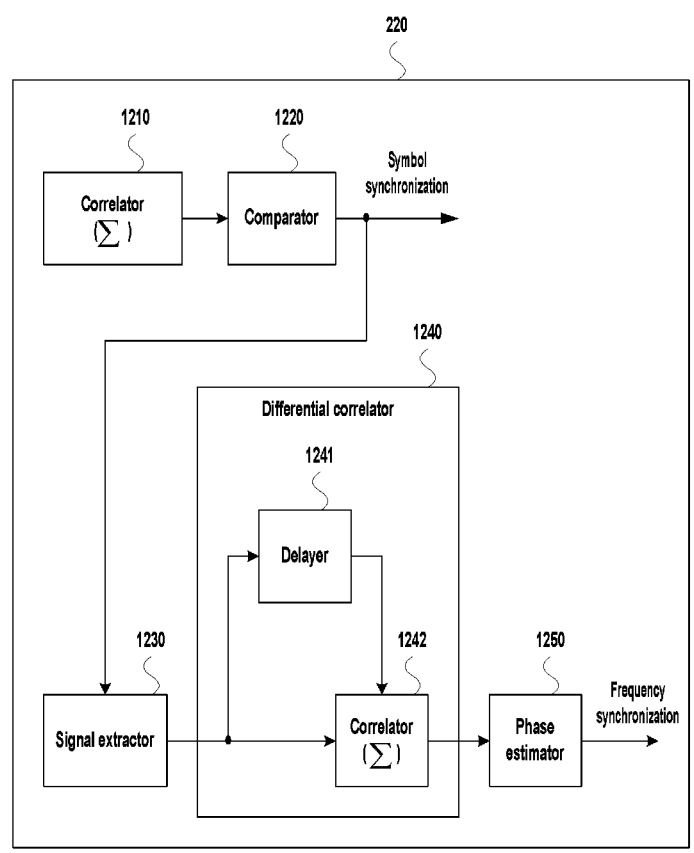
FIG. 15 is a block diagram showing a synchronization detector that detects synchronization from a downlink signal generated according to the exemplary embodiment of FIG. 11.

FIG. 15 is a block diagram showing a synchronization detector 210 that detects synchronization from a downlink signal generated according to the exemplary embodiment of FIG. 11.

As shown in FIG. 15, the synchronization detector 210 for detecting synchronization in the downlink signal generated according to the exemplary embodiment of FIG. 11 includes a correlator 1210, a comparator 1220, a signal extractor 1230, a differential correlator 1240, and a phase estimator 1250. The differential correlator 1240 includes a delayer 1241 and a correlator 1242.

The correlator 1210 correlates the downlink signal received by the downlink signal receiver 210 with the frame synchronization identification sequence, and outputs the correlation result. According to the exemplary embodiment of FIG. 13, the correlator 1210 uses four frame synchronization identification sequences in total, and performs the correlation in parallel. Thereby, the mobile station 200 may obtain frame synchronization by the unit of synchronization blocks.

The comparator 1220 determines symbol synchronization and a location of the synchronization duration 13 by calculating a magnitude (that is, $I^2+Q^2$) of the correlation result outputted form the correlator 1210 and then finding a sample time point where the correlation result becomes above a predetermined level. In addition, the comparator 1220 according to an exemplary embodiment of FIG. 15 finds the index number of the frame synchronization identification sequence by which the magnitude of the correlation result becomes above the predetermined level, and then determines one of the obtained locations of the synchronization duration 13 as the frame synchronization.

The signal extractor 1230 extracts a signal for detecting the frequency synchronization. When a 0 symbol is used for the guard interval, the signal extractor 1230 extracts time domain signals corresponding to the frame synchronization identification sequence by the symbol synchronization obtained by the comparator 1220, and then outputs the same as a signal for detecting frequency synchronization. When a cyclic prefix (CP) is used for the guard interval, the signal extractor 1230 extracts a signal where the guard interval is excluded from a time domain signal corresponding to the frame synchronization identification sequence, and then outputs the same as a signal for detecting the frequency synchronization. The signal outputted by the signal extractor 1230 is described with reference to FIG. 16.

Figure 16:
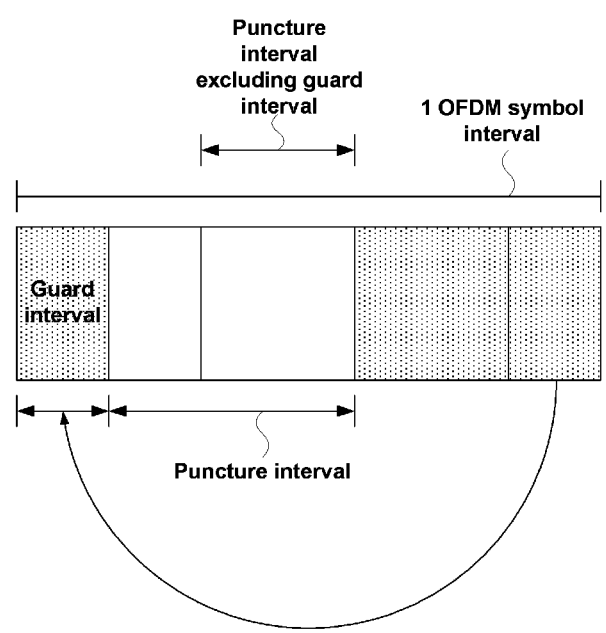
FIG. 16 a drawing showing a signal output by a signal extractor according to an exemplary embodiment of the present invention.

FIG. 16 a drawing showing a signal output by a signal extractor 1230 according to an exemplary embodiment of the present invention.

As shown in FIG. 16, the signal extractor 1230 outputs the signal of a punctured interval when the guard interval consists of 0 symbols. However, the signal extractor 1230 outputs the signal of a puncture interval excluding the guard interval when the guard interval consists of CP.

FIG. 15 is described in continuation.

In order to increase performance in detecting frequency synchronization, the signal extractor 1230 may accumulate signals for a plurality of punctured intervals corresponding to a plurality of synchronization durations in a same frame and then output the accumulated signal as the signal for the frequency synchronization.

The delayer 1241 delays the output signal of the signal extractor 1230 by one or more samples, and then outputs the delayed signal.

The correlator 1242 correlates the output signal of the signal extractor 1230 and the output signal of the delayer 1241, and outputs the differential correlation result.

The phase estimator 1250 obtains frequency offset by estimating a phase of the correlation result outputted by the correlator 1242.

FIG. 13 is described in continuation.

The synchronization duration symbol extractor 230 extracts a synchronization duration symbol of a time domain from the downlink signal, on the basis of the symbol synchronization, the frequency synchronization, and the frame synchronization obtained by the synchronization detector 220 (S430).

The synchronization duration converter 240 converts the synchronization duration symbol of the time domain extracted by the synchronization duration symbol extractor 230 to the synchronization duration symbol in a previous form that is prior to an application of the frame synchronization identification sequence (S440). If the downlink frame 10 of the time domain is generated according to the exemplary embodiment of FIG. 10, the synchronization duration converter 240 multiplies the frame synchronization identification sequence to the synchronization duration symbol of the time domain extracted by the synchronization duration symbol extractor 230 and outputs the multiplication result. If the downlink frame 10 of the time domain is generated according to the exemplary embodiment of FIG. 11, in the synchronization duration symbol of the time domain extracted by synchronization duration symbol extractor 230, signals of periods other than a time period corresponding to the frame synchronization identification sequence are copied by the synchronization duration converter 240 to the time period corresponding to the frame synchronization identification sequence and thus a repetition pattern is formed in the synchronization duration symbol 13.

The FFT calculator 250 performs a fast Fourier operation on the synchronization duration symbol 13 of the time domain outputted by the synchronization duration converter 240, and thereby outputs the synchronization duration symbol 13 of the frequency domain (S450).

The cell identifier 260 extracts a unique cell identification code group from the synchronization duration symbol 13 of the frequency domain outputted by the FFT calculator 260, and identifies a cell by correlating it with a plurality of unique cell identification codes used by the cellular system (S460). According to the exemplary embodiment of FIG. 13, the same unique cell identification code group is applied to each synchronization duration 13. Therefore, the cell identifier 260 obtains a single unique cell identification code group, and obtains a plurality of unique cell identification codes through the single unique cell identification code group. The cell identifier 260 determines different cells when the combination of index numbers of the plurality of unique cell identification codes is different. According to the exemplary embodiment of FIG. 13, the following Table 1 is obtained when the method of cell identification of the cell identifier 260 is tabularized.

TABLE 1

| a | b=0 | b=1 | b=2 | b=3 | ... |
|---|---|---|---|---|---|
| 0 | $0_{(0,0)}$ | $1_{(0,1)}$ | $2_{(0,2)}$ | $3_{(0,3)}$ | ... |
| 1 | $4_{(1,0)}$ | $5_{(1,1)}$ | $6_{(1,2)}$ | $7_{(1,3)}$ | ... |
| 2 | $8_{(2,0)}$ | $9_{(2,1)}$ | $10_{(2,2)}$ | $11_{(2,3)}$ | ... |
| 3 | $12_{(3,0)}$ | $13_{(3,1)}$ | $14_{(3,2)}$ | $15_{(3,3)}$ | ... |
| . | . | . | . | . | . |
| . | . | . | . | . | . |
| . | . | . | . | . | . |

In the notation $C_{(a,b)}$ of Table 1, C denotes a unique cell number, and a and b respectively denote index numbers of first and second unique cell identification codes in the unique cell identification code group.

When an available band of the synchronization channel is 1.25 MHz, the number of entire available subcarriers is approximately 38. In the exemplary embodiment of FIG. 13, when twenty subcarriers are allocated in the first unique cell identification code and eighteen subcarriers are allocated in the second unique cell identification code, the total number of identifiable cells becomes 360 (=20*18).

The cell identifier 260 can verify the extracted unique cell identification code by demodulating a broadcasting channel (BCH) and determining identity of the extracted unique cell identification code and the unique cell identification code included in the broadcasting channel.

As described above, according to the exemplary embodiment of FIG. 13, the synchronization detector 210 may simultaneously obtain symbol synchronization, frame synchronization, and frequency synchronization, by performing correlation by frame synchronization identification sequences according to the number of synchronization durations.

Figure 17:
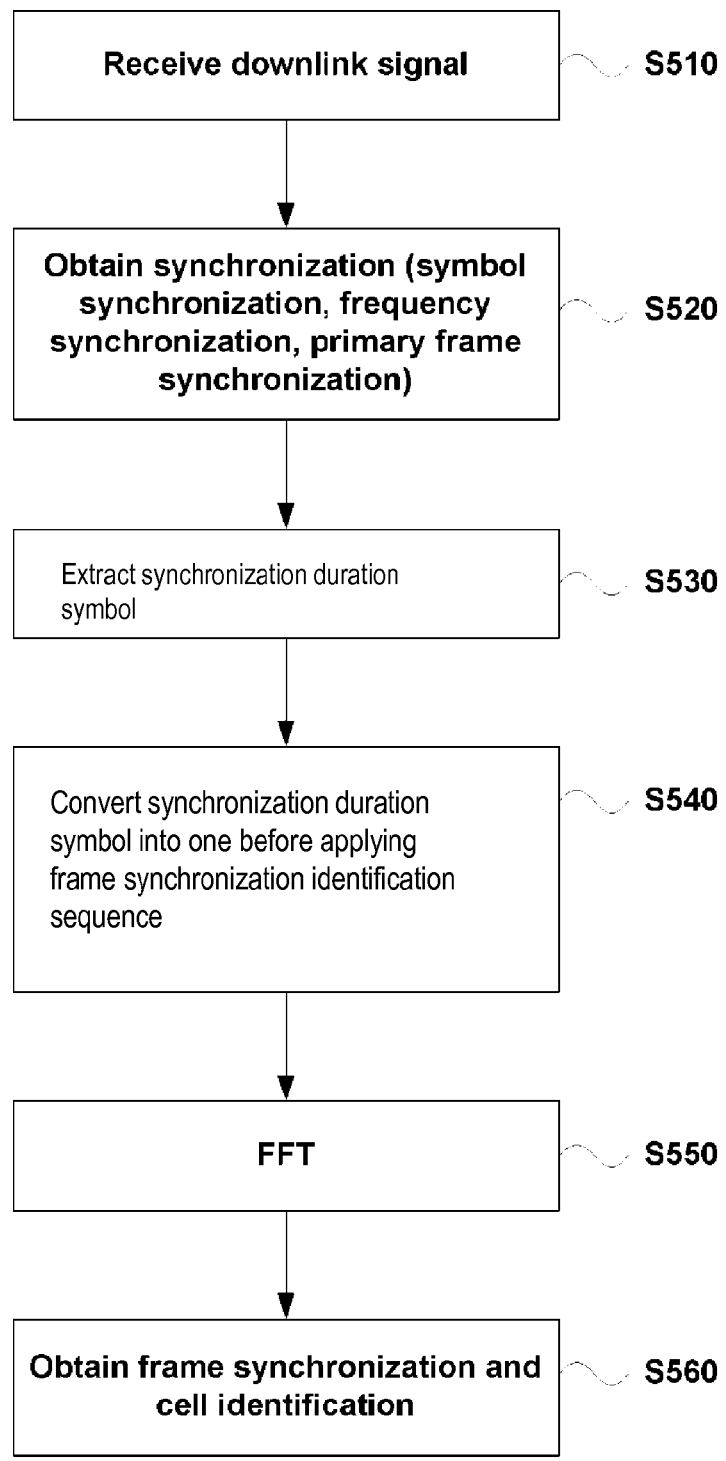
FIG. 17 is a flowchart showing a cell search method according to a second exemplary embodiment of the present invention.

FIG. 17 is a flowchart showing a cell search method according to a second exemplary embodiment of the present invention.

Firstly, the downlink signal receiver 210 receives a downlink signal from a channel (S510). The downlink signal receiver 210 according to an exemplary embodiment of FIG. 17 receives the downlink signal generated according to an exemplary embodiment of FIG. 8.

Subsequently, the plurality of frame synchronization identification sequences that are respectively applied to the plurality of synchronization durations included in the downlink frame are applied by the synchronization detector 220 to the downlink signal that is received by the downlink signal receiver 210. Thereby the synchronization detector 220 obtains symbol synchronization, frequency synchronization, and primary frame synchronization (S420). When the downlink frame is in a structure according to the Equation 4, the synchronization detector 220 uses two frame synchronization identification sequences. The synchronization detector 220 can determine locations of synchronization durations included in the downlink frame based on the plurality of frame synchronization identification sequences. However, since a smaller number of frame synchronization identification sequences than the number of synchronization durations is used in the exemplary embodiment of FIG. 17, the synchronization detector 220 can only determine a part of frame synchronization (i.e., primary frame synchronization). The same as in the exemplary embodiment of FIG. 13, the synchronization detector 220 according to an exemplary embodiment of FIG. 17 also has different structures depending on methods by which the downlink signal is generated, and a further detailed description is omitted.

Based on the symbol synchronization, the frequency synchronization, and the primary frame synchronization obtained by the synchronization detector 220, the synchronization duration symbol extractor 230 extracts synchronization duration symbols 13 by at least the number corresponding to the primary frame synchronization (S530).

The synchronization duration converter 240 converts the plurality of synchronization duration symbols 13 extracted by the synchronization duration symbol extractor 230 to synchronization duration symbols 13 in a previous form that is prior to an application of the frame synchronization identification sequence (S540). If the downlink frame 10 of the time domain is generated according to the exemplary embodiment of FIG. 10, the synchronization duration converter 240 multiplies the frame synchronization identification sequence to the synchronization duration symbol 13 of the time domain extracted by the synchronization duration symbol extractor 230 and outputs the multiplication result. If the downlink frame 10 of the time domain is generated according to the exemplary embodiment of FIG. 11, in the synchronization duration symbol, signals of periods other than a time period corresponding to the frame synchronization identification sequence are copied by the synchronization duration converter 240 to the time period corresponding to the frame synchronization identification sequence, and thus a repetition pattern is formed in the synchronization duration symbol 13.

The FFT calculator 250 performs a fast Fourier operation on the synchronization duration symbol 13 of the time domain outputted by the synchronization duration converter 240, and thereby outputs the synchronization duration symbol 13 of the frequency domain (S550).

The cell identifier 260 extracts a plurality of unique cell identification code groups from the plurality of synchronization duration symbols 13 of the frequency domain outputted by the FFT calculator 260, and identifies cells by correlating them with a plurality of unique cell identification codes used by the cellular system (S560). According to the exemplary embodiment of FIG. 17, the same unique cell identification code group is applied to each synchronization duration group. Therefore, the cell identifier 260 obtains unique cell identification code groups corresponding to the number of synchronization duration groups. The cell identifier 260 can obtain the frame synchronization through the plurality of extracted unique cell identification codes groups and the primary frame synchronization obtained by the synchronization detector 220.

According to the exemplary embodiment of FIG. 17, the following Table 2 is obtained when the method of cell identification of the cell identifier 260 is tabularized.

TABLE 2

| a | b |  |  |  |  |
|---|---|---|---|---|---|
|  | 0 | 1 | 2 | 3 | ... |
| 0 | $0_{(0,0)}$ | $0_{(0,1)}$ | $1_{(0,2)}$ | $1_{(0,3)}$ | ... |
| 1 | $2_{(1,0)}$ | $2_{(1,1)}$ | $3_{(1,2)}$ | $3_{(1,3)}$ | ... |
| 2 | $4_{(2,0)}$ | $4_{(2,1)}$ | $5_{(2,2)}$ | $5_{(2,3)}$ | ... |
| 3 | $6_{(3,0)}$ | $6_{(3,1)}$ | $7_{(3,2)}$ | $7_{(3,3)}$ | ... |
| . | . | . | . | . | . |
| . | . | . | . | . | . |
| . | . | . | . | . | . |

In Table 2, the unique cell identification code groups (0,0) and (0,1) indicate one cell. However, the cell identifier 260 can obtain frame synchronization through the unique cell identification code group that is duplicately used in order to indicate one cell.

When an available band of the synchronization channel is 1.25 MHz, the number of entire available subcarriers is approximately 38. In the exemplary embodiment of FIG. 17, when twenty subcarriers are allocated in the first unique cell identification code and eighteen subcarriers are allocated in the second unique cell identification code, the total number of identifiable cells becomes 180 (=20*18/2). This is, the number of identifiable cells in the exemplary embodiment of FIG. 17 is half the number of identifiable cells in the exemplary embodiment of FIG. 13. However, the number of frame synchronization identification sequences used for obtaining symbol synchronization and primary frame synchronization can be reduced to half in comparison with the exemplary embodiment of FIG. 13, and therefore complexity is reduced.

As described above, according to the exemplary embodiment of FIG. 17, the synchronization detector 210 can obtain the symbol synchronization, the frequency synchronization, and the primary frame synchronization in the time domain by performing correlation involving a lesser number of frame synchronization identification sequences than the number of synchronization durations, and can obtain frame synchronization in the frequency domain through the unique cell identification codes.

Figure 18:
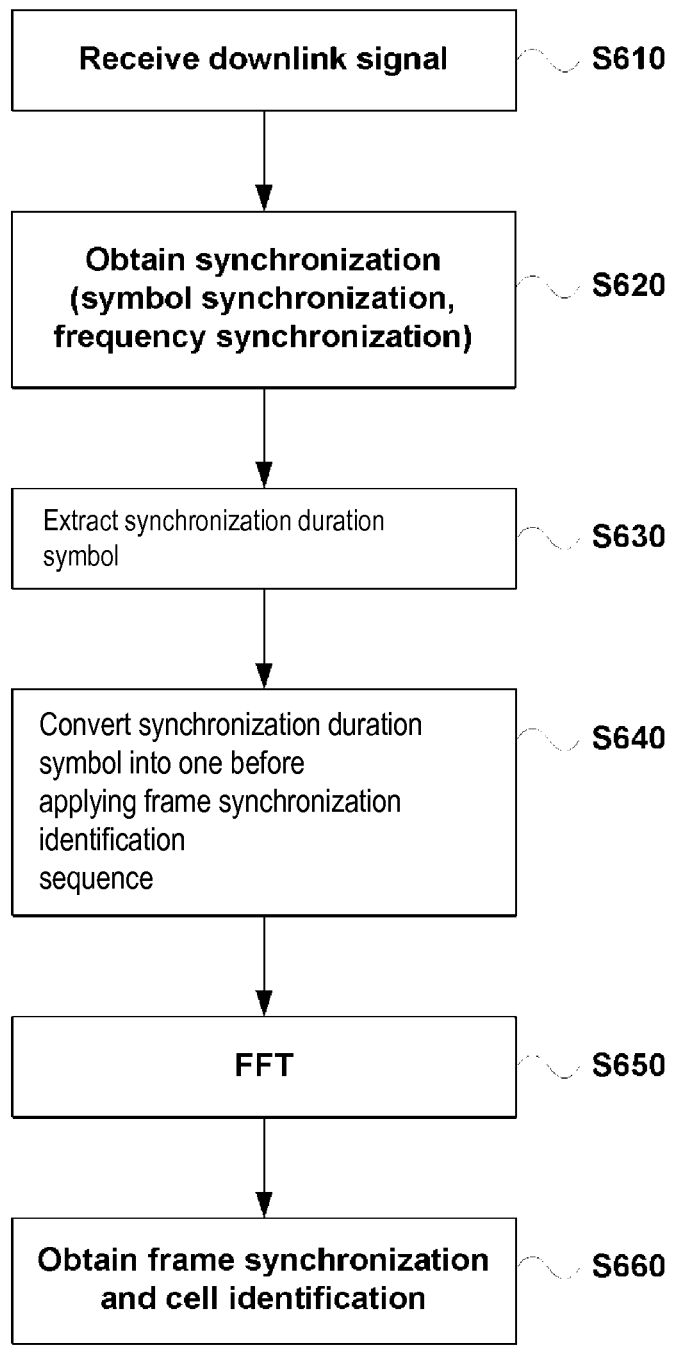
FIG. 18 is a flowchart showing a cell search method according to a third exemplary embodiment of the present invention.

FIG. 18 is a flowchart showing a cell search method according to a third exemplary embodiment of the present invention.

Firstly, the downlink signal receiver 210 receives a downlink signal from a channel (S610). The downlink signal receiver 210 according to an exemplary embodiment of FIG. 18 receives the downlink signal generated according to an exemplary embodiment of FIG. 9.

Subsequently, the synchronization detector 220 applies a single frame synchronization identification sequence to the downlink signal received by the downlink signal receiver 210. Thereby, the synchronization detector 220 obtains symbol synchronization and frequency synchronization, and determines locations of synchronization durations (S620). However, since a smaller number of frame synchronization identification sequences than the number of synchronization durations is used in the exemplary embodiment of FIG. 18, the synchronization detector 220 cannot obtain frame synchronization. The same as in the exemplary embodiment of FIG. 13, the synchronization detector 220 according to an exemplary embodiment of FIG. 18 also has different structures depending on methods by which the downlink signal is generated, and a further detailed description is omitted.

Based on the symbol synchronization, the frequency synchronization, and the locations of the synchronization durations obtained by the synchronization detector 220, the synchronization duration symbol extractor 230 extracts synchronization duration symbols 13 by a number greater than or equal to the number corresponding to one downlink frame (S630).

The synchronization duration converter 240 converts the plurality of synchronization duration symbols extracted by the synchronization duration symbol extractor 230 to synchronization duration symbols that are prior to an application of the frame synchronization identification sequence, and outputs the converted symbols (S640). If the downlink frame 10 of the time domain is generated according to the exemplary embodiment of FIG. 10, the synchronization duration converter 240 multiplies the frame synchronization identification sequence to the synchronization duration symbol extracted by the synchronization duration symbol extractor 230. If the downlink frame 10 of the time domain is generated according to the exemplary embodiment of FIG. 11, in the synchronization duration symbol extracted by the synchronization duration symbol extractor 230, signals of periods other than a time period corresponding to the frame synchronization identification sequence are copied by the synchronization duration converter 240 to the time period corresponding to frame synchronization identification sequence and thus a repetition pattern is formed in the synchronization duration symbol.

The FFT calculator 250 performs a fast Fourier operation on the synchronization duration symbol of the time domain outputted by the synchronization duration converter 240, and thereby outputs the synchronization duration symbol of the frequency domain (S650).

The cell identifier 260 extracts a plurality of unique cell identification code groups from the plurality of synchronization duration symbols of the frequency domain outputted by the FFT calculator 260, and identifies cells by correlating them with a plurality of unique cell identification codes used by the cellular system (S660). According to the exemplary embodiment of FIG. 18, different unique cell identification code groups are applied to respective synchronization durations. Therefore, the cell identifier 260 obtains unique cell identification code groups corresponding to the number of synchronization durations, and the plurality of obtained unique cell identification code groups indicate one cell. The cell identifier 260 can obtain the frame synchronization through the plurality of extracted unique cell identification codes groups and the location of the synchronization duration obtained by the synchronization detector 220.

According to the exemplary embodiment of FIG. 18, the following Table 3 is obtained when the method of cell identification of the cell identifier 260 is tabularized.

TABLE 3

| a | b |  |  |  |  |
|---|---|---|---|---|---|
|  | 0 | 1 | 2 | 3 | ... |
| 0 | $0_{(0,0)}$ | $0_{(0,1)}$ | $0_{(0,2)}$ | $0_{(0,3)}$ | ... |
| 1 | $1_{(1,0)}$ | $1_{(1,1)}$ | $1_{(1,2)}$ | $1_{(1,3)}$ | ... |

TABLE 3-continued

| a | b=0 | b=1 | b=2 | b=3 | ... |
|---|---|---|---|---|---|
| 2 | $2_{(2,0)}$ | $2_{(2,1)}$ | $2_{(2,2)}$ | $2_{(2,3)}$ | ... |
| 3 | $3_{(3,0)}$ | $3_{(3,1)}$ | $3_{(3,2)}$ | $3_{(3,3)}$ | ... |
| . | . | . | . | . | |
| . | . | . | . | . | |
| . | . | . | . | . | |

In Table 2, the unique cell identification code groups (0,0), (0,1), (0,2), and (0,3) indicate one cell. However, the cell identifier 260 can obtain frame synchronization through the unique cell identification code group that is duplicately used in order to indicate one cell.

When an available band of the synchronization channel is 1.25 MHz, the number of all available subcarriers is approximately 38. In the exemplary embodiment of FIG. 18, when twenty subcarriers are allocated in the first unique cell identification code and eighteen subcarriers are allocated in the second unique cell identification code, the total number of identifiable cells becomes 90 (=20*18/4). This is, the number of identifiable cells in the exemplary embodiment of FIG. 18 is a quarter of the number of identifiable cells in the exemplary embodiment of FIG. 13. However, since the symbol synchronization and the location of synchronization duration may be obtained by one frame synchronization identification sequence, complexity is reduced in comparison with the exemplary embodiment of FIG. 13.

As described above, according to the exemplary embodiment of FIG. 18, the synchronization detector 210 can obtain the symbol synchronization, the frequency synchronization, and the location of the synchronization duration in the time domain by performing correlation with one frame synchronization identification sequence, and can obtain frame synchronization in the frequency domain through the unique cell identification codes.

According to an exemplary embodiment of the present invention, an apparatus for generating a downlink signal divides one frame into a plurality of synchronization blocks and arranges a frame synchronization identification sequence to each synchronization block. Therefore, a mobile station may perform rapid synchronization acquisition and cell search.

The exemplary embodiment of the present invention described above is not only realized in the form of a method and an apparatus, but it can be realized by a program or a recorded medium storing the program for enabling a function corresponding to a constitution of the exemplary embodiment of the present invention, which may be easily implemented by an expert in the field of the present invention referring to the above description of the exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an exemplary embodiment of the present invention, an apparatus for generating a downlink signal applies a frame synchronization identification sequence in a time domain. Therefore, rapid synchronization acquisition is enabled since the mobile station may obtain the frame synchronization prior to performing FFT.

Furthermore, according to an exemplary embodiment of the present invention, an apparatus for generating a downlink signal duplicately uses a unique cell identification code group in order to indicate one cell, and the duplicate unique cell identification code group is used for obtaining frame synchronization. Therefore, a mobile station may experience less complexity in obtaining symbol synchronization and frame synchronization.

The invention claimed is:

1. A method for generating a downlink signal, comprising:
    generating a plurality of unique cell identification code groups; and
    allocating the plurality of unique cell identification code groups to a plurality of synchronization durations within a downlink frame, respectively,
    wherein the plurality of unique cell identification code groups comprise a first code group which is formed by a concatenation of a first cell identification code and a second cell identification code,
    wherein the plurality of unique cell identification code groups further comprise a second code group which is formed by a concatenation of the second cell identification code and the first cell identification code,
    wherein the first code group is different from the second code group, and wherein the concatenation of the first cell identification code and the second cell identification code represents cell identification information.

2. The method of claim 1, wherein the first code group is allocated in a first OFDM symbol duration, and the second code group is allocated in a second OFDM symbol duration.

3. The method of claim 2, wherein elements of the first cell identification code in the first OFDM symbol duration is allocated in a first carrier group and elements of the second cell identification code in the first OFDM symbol duration is allocated in a second carrier group.

4. The method of claim 3, wherein elements of the first cell identification code in the second OFDM symbol duration is allocated in the second carrier group and elements of the second cell identification code in the second OFDM symbol duration is allocated in the first carrier group.

5. The method of claim 1, wherein the first and second code groups represent frame synchronization information.

6. The method of claim 1, wherein the first and second cell identification codes are binary code.

7. A method for searching a cell, comprising: receiving a plurality of unique cell identification code groups; and
    obtaining cell identification information based on at least one of the plurality of unique cell identification code groups,
    wherein the plurality of unique cell identification code groups are allocated to a plurality of synchronization durations within a downlink frame, respectively,
    wherein the plurality of unique cell identification code groups comprise a first code group which is formed by a concatenation of a first cell identification code and a second cell identification code,
    wherein the plurality of unique cell identification code groups further comprise a second code group which is formed by a concatenation of the second cell identification code and the first cell identification code,
    wherein the first code group is different from the second code group, and wherein the concatenation of the first cell identification code and the second cell identification code represents cell identification information.

8. The method of claim 7, wherein the first code group is allocated in a first OFDM symbol duration, and the second code group is allocated in a second OFDM symbol duration.

9. The method of claim 8, wherein elements of the first cell identification code in the first OFDM symbol duration is allocated in a first carrier group and elements of the second cell identification code in the first OFDM symbol duration is allocated in a second carrier group.

10. The method of claim 9, wherein elements of the first cell identification code in the second OFDM symbol duration is allocated in the second carrier group and elements of the second cell identification code in the second OFDM symbol duration is allocated in the first carrier group.

11. The method of claim 7, wherein the first and second code groups represent frame synchronization information.

12. The method of claim 7, wherein the first and second cell identification codes are binary code.

13. An apparatus for searching a cell, comprising: a receiver for receiving a plurality of unique cell identification code groups; and
a cell identifier for obtaining cell identification information based on at least one of the plurality of unique cell identification code groups wherein the plurality of unique cell identification code groups are allocated to a plurality of synchronization durations within a downlink frame, respectively,
wherein the plurality of unique cell identification code groups comprise a first code group which is formed by a concatenation of a first cell identification code and a second cell identification code,
wherein the plurality of unique cell identification code groups further comprise a second code group which is formed by a concatenation of the second cell identification code and the first cell identification code,
wherein the first code group is different from the second code group, and wherein the concatenation of the first cell identification code and the second cell identification code represents cell identification information.

14. The apparatus of claim 13, wherein the first code group is allocated in a first OFDM symbol duration, and the second code group is allocated in a second OFDM symbol duration.

15. The apparatus of claim 14, wherein elements of the first cell identification code in the first OFDM symbol duration is allocated in a first carrier group and elements of the second cell identification code in the first OFDM symbol duration is allocated in a second carrier group.

16. The apparatus of claim 15, wherein elements of the first cell identification code in the second OFDM symbol duration is allocated in the second carrier group and elements of the second cell identification code in the second OFDM symbol duration is allocated in the first carrier group.

17. The apparatus of claim 13, wherein the first and second code groups represent frame synchronization information.

18. The apparatus of claim 13, wherein the first and second cell identification codes are binary code.

19. An apparatus for generating a downlink frame in a wireless communication system, the apparatus comprising:
a generator for generating a plurality of unique cell identification code groups; and
an applier for allocating the plurality of unique cell identification code groups to a plurality of synchronization durations within a downlink frame, respectively,
wherein the plurality of unique cell identification code groups comprise a first code group which is formed by a concatenation of a first cell identification code and a second cell identification code,
wherein the plurality of unique cell identification code groups further comprise a second code group which is formed by a concatenation of the second cell identification code and the first cell identification code,
wherein the first code group is different from the second code group, and wherein the concatenation of the first cell identification code and the second cell identification code represents cell identification information.

20. The apparatus of claim 19, wherein the first code group is allocated in a first OFDM symbol duration, and the second code group is allocated in a second OFDM symbol duration.

21. The apparatus of claim 20, wherein elements of the first cell identification code in the first OFDM symbol duration is allocated in a first carrier group and elements of the second cell identification code in the first OFDM symbol duration is allocated in a second carrier group.

22. The apparatus of claim 21, wherein elements of the first cell identification code in the second OFDM symbol duration is allocated in the second carrier group and elements of the second cell identification code in the second OFDM symbol duration is allocated in the first carrier group.

23. The apparatus of claim 19, wherein the first and second code groups represent frame synchronization information.

24. The apparatus of claim 19, wherein the first and second cell identification codes are binary code.

25. A computer-readable non-transitory medium that stores a program that is executable by a computer to perform a method comprising:
generating a plurality of unique cell identification code groups; and
allocating the plurality of unique cell identification code groups to a plurality of synchronization durations within a downlink frame, respectively,
wherein the plurality of unique cell identification code groups comprise a first code group which is formed by a concatenation of a first cell identification code and a second cell identification code,
wherein the plurality of unique cell identification code groups further comprise a second code group which is formed by a concatenation of the second cell identification code and the first cell identification code,
wherein the first code group is different from the second code group, and wherein the concatenation of the first cell identification code and the second cell identification code represents cell identification information.

* * * * *